3,193,461
CORRECTING BLOOD CHANGES WITH NIACIN,
VITAMIN A, AND RIBOFLAVIN
Milton E. Eisen, Riverdale, N.Y., assignor to
Sophie R. Gordon, New York, N.Y.
No Drawing. Filed June 14, 1957, Ser. No. 665,654
2 Claims. (Cl. 167—81)

This invention relates to a composition capable of producing relief in arteriosclerotic and blood conditions such as are believed to result from smoking.

Normally carbon dioxide, one of the waste products of the tissues, is picked up by the hemoglobin of the red blood cells, carried in easily reversible combination to the lungs where it is exchanged for oxygen which is then carried to the tissues as oxyhemoglobin.

There the oxygen is released, and the red blood cells again pick up carbon dioxide resuming the tissues-to-lungs-to-tissues cycle. However, in the case of carbon monoxide, an irreversible compound with hemoglobin is formed. To replace the red blood cells thus rendered incapable of carrying oxygen and carbon dioxide, the blood-forming organs are stimulated to produce new red blood cells. And so the result is sigher red blood cell counts, higher hemoglobin percentages, elevated blood cell volumes (hematocrits), lower blood sedimentation values (reflecting a higher percentage of red blood cells over the liquid blood plasma); and the thickened blood clots more quickly than it would normally. All these changes are found in smokers' blood. Thus smoking is believed to contribute to thrombosis.

A further object of the invention is the provision of compounds which include vitamin A, niacin (nicotinic acid) and riboflavin. Since smoking results in lowered oxygen supply, it is significant that all of the above substances are respiratory enzymes. Niacin increase metabolism and hence regeneration. It also increases resistance to anoxia (absence of or very low oxygen) in rats. Riboflavin is an oxidation enzyme which by virtue of its easily reversible oxidation-reduction reactions can act as an oxygen transport between molecular oxygen and the substrate. For example, if an animal heart is perfused with low oxygen, the muscular contractions are weakened. A normal heart beat is restored either by physiologic oxygen pressure or by adding a minute amount of riboflavin to the perfusion medium.

Thus both niacin and riboflavin may be used to compensate for the lowered oxygen supply caused by tobacco smoking.

Because it is important to control the increased tendency to clotting which has been found in smokers' blood, the following findings in animals on high vitamin A dosage support the merit of this invention:

(1) Prothrombin is one of the substances necessary to the mechanics of bood clotting. Vitamin A has produced hypoprothrombinemia (low prothrombin in the blood) in rats.

(2) On high vitamin dosage the packed red blood cell volumes (hematocrits) have dropped as much as 13 percent. This would make the animal's blood less "thick."

(3) An excess of calcium excretion over intake is reported in animals on high vitamin A dosage. Calcium is also essential to blood coagulation; so this effect of vitamin A should retard clotting time. And it may favor decalcification of the arteriosclerotic process in the blood vessels which has been considered irreversible.

The physiology of the blood vessel wall is also reported as favorably influenced by vitamin A due to its high surface tension properties. Niacin affects blood vessel function by its vasodilator action.

It has been shown to aid angiospasm in retinal hypertension, to reinforce the action of acetylcholine (a vasodilator itself) on certain muscles of anaesthesized rats. It has shortened the period of spasm in mice given strychnine and gave some protection against metrazole shock in rats, rabbits, guinea pigs and dogs.

The metabolism of fats, also implicated in hardening of the arteries, is favorably affected by both riboflavin and vitamin A. An actual improvement in the atheromatose condition in old atherosclerotic hens has been reported with high vitamin A dosage alone and with vitamins A and E given together; and even a mild riboflavin deficiency has caused lipoidal degeneration of the proximal convoluted tubules of the kidney and fatty degeneration of the liver in animals.

That cardiovascular pathology may be favorably affected by our invention is further supported by the following evidence:

All three substances (vitamin A, riboflavin and niacin) increase metabolism and hence repair of tissues. That vitamin A can act directly on the lining of the blood vessel is suggested by experiments of Fell and Mellanby. The cultivation of the ectoderm of chick embryo in media containing excessive vitamin A resulted in suppressing the "keratinizing" epithelium which is hard and thickened and in substituting a mucous-secreting ciliated epithelium. Explants into a normal medium resulted in differentiation of the basal cells into squamous keratinizing epithelium.

Niacin has lessened scar in humans following corneal ulcers. Its deficiency is not known to selectively damage the heart, yet independent studies of human pellagra have shown a very high incidence of abnormal electrocardiograms. These effects are mainly of the myocardial type rather than condution defects. Inverted $T_1$ and/or $T_2$, pardee-type S-T intervals, notched or low-voltage ventricular complexes and other defects were noted. Most of these abnormalities disappeared promptly following therapy with niacin; and niacin has been used successfully over a period of ten years in the treatment of cardio-respiratory failure and of the embolic syndromes of the limbs. A synergism has been demonstrated between vitamin A and niacin in the physiology of vision, the only function of vitamin A which is fully understood. In the retina, niacin performs the peculiar function of helping to regenerate vitamin A.

Vitamin A is obtained from the visual pigments by reduction by the enzyme, alcohol dehydrogenase. Another enzyme, cozymase, acts with alcohol dehydrogenase. Niacinamide and alpha tocopheryl phosphate protect cozymase from destruction by another enzyme, nucleosidase, which is widely distributed in animal tissues. Niacinamide is an active constituent of cozymase. This knowledge of the function of vitamin A in vision has become a guide to the more general metabolism of vitamin A.

The following examples are given by way of example to illustrate the invention and it will be understood that they are prepared in capsule form for oral administration:

1

| | | |
|---|---|---|
| Niacin | mg | 50 |
| Vitamin A | U.S.P. units | 50,000 |
| Riboflavin | mg | 5 |

2

| | | |
|---|---|---|
| Niacin | mg | 50 |
| Vitamin A | U.S.P. units | 50,000 |
| Riboflavin | mg | 10 |

3

| | | |
|---|---|---|
| Niacin | mg | 17 |
| Vitamin A | U.S.P. units | 17,000 |
| Tocopherol * | mg | 50 |

4

| | | |
|---|---|---|
| Niacin | mg | 17 to 50 |
| Vitamin A | U.S.P. units | 17,000 to 50,000 |
| Tocopherols * | I.U. | 35 to 100 |
| Riboflavin | mg | 3 to 10 |

*Mixed tocopherols, alpha tocopherol alone or its esters.

5

| | | |
|---|---|---|
| Niacin | mg | 17–50 |
| Vitamin A | U.S.P. units | 17,000–50,000 |
| Vitamin $B_6$ | mg | 1–10 |
| Riboflavin | mg | 5–10 |

6

| | | |
|---|---|---|
| Niacin | mg | 17–50 |
| Vitamin A | U.S.P. units | 17,000–50,000 |
| Vitamin $B_6$ | mg | 1–10 |
| Riboflavin | mg | 5–10 |
| Rutin | mg | 10–20 |

(7) Vitamin $B_1$ (thiamine chloride or mononitrate) 10–25 mg. added to any of the above combinations.

Other illustrative examples include:

8

| | | |
|---|---|---|
| Vitamin A | U.S.P. units | 10,000–50,000 |
| Niacin | mg | 10–60 |
| Riboflavin | mg | 4–11 |

9

| | | |
|---|---|---|
| Vitamin A | U.S.P. units | 10,000–50,000 |
| Niacin | mg | 10–60 |
| Riboflavin | mg | 4–11 |
| Vitamin $B_2$ | mg | 9–26 |

10

| | | |
|---|---|---|
| Vitamin A | U.S.P. units | 15,000–25,000 |
| Niacin | mg | 17–50 |
| Tocopherols | I.U. | 30–110 |

11

| | | |
|---|---|---|
| Vitamin A | U.S.P. units | 15,000–25,000 |
| Niacin | mg | 17–50 |
| Tocopherols | I.U. | 30–110 |
| Riboflavin | mg | 3–10 |

12

| | | |
|---|---|---|
| Vitamin A | U.S.P. units | 15,000–25,000 |
| Niacin | mg | 17–50 |
| Tocopherols | I.U. | 30–110 |
| Vitamin $B_2$ | mg | 10–60 |

(The tocopherols are included because they have been shown to enhance the effects of vitamin A, producing greatly increased vitamin A blood levels than when the vitamin A was given alone. Vitamin E combined with vitamin A was much more effective in improving the lesions of the vasal walls in experimental atherosclerosis than when either substance was used alone. The tocopherols (vitamin E) are natural antioxidants which protect the vitmin A from oxidation and potency loss. They have also been shown to protect animals exposed to low oxygen pressures which simulated 30,000 ft. altitudes. This study was undertaken to determine whether tocopherol could protect our fllers against the effects of high altitudes. It was made at the Air Force School, Aviation Medicine, Randolph Field, Tex. and the University of Texas.)

The tolazoline HCL is added because of its vasodilator action; ascorbic acid, rutin and vitamin $B_6$ for their effects on blood vessel metabolism and integrity.

Since there is evidence that vitamin A acts directly upon "competent tissues," a special-type, slow-releasing capsule was sought in which to incorporate our invention.

It was felt that the treatment should be sustained continuously within the blood vessel, if this were possible.

The ordinary soft-shell capsule would not fulfill this requirement because it spills its contents all at once with such quick absorption of the water-soluble ingredients that high dosage cannot be sustained and much is wasted in rapid excretion by the kidneys.

The capsule chosen for the invention has a solid gelatin matrix, in which the medicaments have been emulsified with the gelatin and other suitable substances, then slowly cooled and hardened during about a month's time. The capsule is then coated with gelatin.

During digestion the contents of this solid matrix capsule are discharged very gradually, taking about five hours' time. So, by spacing medication with one capsule 3 or 4 times a day, it is possible to sustain the treatment steadily for 15 to 20 out of the 24 hours of each day. Moreover, the oil-soluble vitamin A is highly absorbed due to its microscopic dispersion.

This type of oil-soluble vitamin therapy has been very favorably reported on, to the extent that its effect is increased many fold.

The usual waste of the water-soluble components due to too rapid absorption and excretion is prevented and the formulation of optimal amounts of the different ingredients of the invention in very accurate quantities is assured by this special type, solid-matrix capsule.

Although several formulas constituting the invention have been given by way of example, it will be understood that many variations may be made in the formula given within the scope of the following claims.

Having now particularly described and ascertained the nature of the invention, and in what manner the same is to be performed, what is claim is:

1. In a method of correcting changes in blood composition, including reducing hematocrits, increasing sedimentation values, lengthening blood clotting time and assisting the healing of lesions of blood vessels in human beings susceptible to increased hematocrits, lowered sedimentation values, shortened blood clotting time and lesions of blood vessels, the improvement which consists essentially of the step of administering daily at least about 50 mgs. of niacin, at least about 50,000 U.S.P. units of vitamin A and at least about 5 mgs. of riboflavin.

2. A method according to claim 1 where there is administered from at least about 50,000 to about 200,000 U.S.P. units of vitamin A, from at least about 50 to about 300 mgs. of niacin, and from at least about 5 to about 44 mgs. of riboflavin.

References Cited by the Examiner

Eisen, "Effect of Vitamin A, Niacin, and Riboflavin on Vascular Lesions," American Journal of Surgery, vol. 95, No. 3, March 1958, pages 438–444.

"Essentials of Pharmacology," by Oldham, Kelsey and Geiling, Third Edition, published by J. P. Lippincott Co., Philadelphia, Pa., 1955, pages 334, 335, 336, 342 and 349.

"Food—The Yearbook of Agriculture," 1959, The United States Department of Agriculture, Washington, D.C., page 133 (Vitamin A), 1942 (Riboflavin), 144 (Niacine-Nicotinic acid), pages 277–230 (recommended daily allowances; revised 1958).

Modern Drug Encyclopedia, Drug Publication, Inc., New York, N.Y., Sixth ed., 1955, edited by Howard, page 461, entry "Gevral Protein."

Horwitt et al., "Effects of Dietary Depletion of Riboflavin," Journal of Nutrition, vol 39, 1949, pages 357–373.

Howard, Modern Drug Encyclopedia, 6th Edition, 1955, page 283.

Howard, Ibid., page 461.

Howard, Ibid., page 847.

J. Am. Pharmaceutical Assn. (JAPhA), Practical Pharm. Ed., vol. 20, No. 4, Apr. 1959, page 222, "Use of Nicotinic Acid in Hypercholesteremia."

(Other references on following page)

J. A. Ph.A., Prac. Phy. Edition, vol. 20, No. 4, Apr. 1959, page 222. "Evaluation of the usefulness and safety of large oral doses of the vitamin, nicotinic acid (niacin)."

Maddock et al., "Hypoprothrombinemia with hemorrhage as a cause of death in the rat on hypervitaminosis-A," Federation Proceedings, American Society for Experimental Pathology, vol. 7, 1948, page 275.

Parsons et al., "Effect of Nicotinic Acid in Hypercholesterolemias," Proc. Staff meet., Mayo Clinic, vol. 31, pages 377–390, 1956.

Symposium on Clinical Trials, Royal Society of Medicine, London, April 25, 1958. (Report, 77 pages.)

LEWIS GOTTS, *Primary Examiner.*

MORRIS O. WOLK, *Examiner.*